United States Patent [19]

Nachfolger et al.

[11] Patent Number: 5,221,699
[45] Date of Patent: Jun. 22, 1993

[54] AQUEOUS PRINTING FLUID

[75] Inventors: Solomon J. Nachfolger, Monsey, N.Y.; Timothy C. Vogel, Kenvil, N.J.

[73] Assignee: Sun Chemical Corporation, Fort Lee, N.J.

[21] Appl. No.: 993,943

[22] Filed: Dec. 18, 1992

[51] Int. Cl.$^5$ .................. C08L 63/00; C09B 44/00; C09B 23/00; C09B 67/00
[52] U.S. Cl. ................... 523/402; 523/423; 523/461; 8/554; 8/555; 8/654; 8/657
[58] Field of Search ............ 523/402, 414, 423, 461; 8/495, 496, 552, 554, 555, 654, 657, 919

[56] References Cited

U.S. PATENT DOCUMENTS

| 3,860,547 | 1/1975 | Faessinger et al. | 8/496 |
| 3,864,296 | 2/1975 | Faessinger | 260/29.2 |
| 3,880,792 | 4/1975 | Faessinger | 260/29.2 |
| 4,054,542 | 10/1977 | Buckman et al. | 8/554 |

Primary Examiner—Paul R. Michl
Assistant Examiner—Peter Szekely
Attorney, Agent, or Firm—Jack Matalon

[57] ABSTRACT

Printing fluid for printing cellulosic materials comprising (a) water; (b) a cationic polyaminoamide/epichlorohydrin resin; (c) a water soluble cationic dye; and (d) 0 up to about 3 wt. %, based on the weight of the printing fluid, of a bleachable pigment. The fluid preferably also contains up to about 50 wt. %, based on the weight of the fluid, of urea to enhance color strength. The printing fluid has excellent bleed resistance to common household products but is nevertheless bleachable so that printed materials such as paper toweling may be repulped and recycled.

10 Claims, No Drawings

AQUEOUS PRINTING FLUID

FIELD OF THE INVENTION

The invention relates to aqueous printing fluids useful for printing cellulosic materials such as single or multi-ply toilet/facial tissue, single or multi-ply absorbent wiping towels, single or multi-ply napkins and the like.

BACKGROUND OF THE INVENTION

Printing fluids for printing cellulosic materials of the type referred to above are well known in the prior art. Paper towel printing fluids can utilize dyes or pigments for printing designs on upscale paper towels. Paper towels printed with fluids containing pigments are more difficult to repulp (repulping is the conventional method of recycling paper toweling) than those containing dyes since the pigments are not bleachable. Indeed, the use of printing fluids containing more than 25% pigment results in a dirty base stock upon repulping.

Bleachable dye printing fluids allow higher repulp percentages along with lower raw material costs, but paper towels printed with such fluids bleed badly. The printing fluids of the present invention, however, are unique in that paper towels printed with such fluids do not bleed, yet they are readily bleachable and disappear during the repulping process.

Prior art printing fluids containing dyes are deficient in many respects, particularly bleed resistance, i.e. resistance to print bleeding from the imprinted substrate, e.g. paper toweling, when the substrate is exposed to common household materials, e.g. vinegar, alkaline-type household detergents (e.g. "Formula 409"), water, milk, soft drinks containing citric acid (e.g. "Sprite"). Other problems associated with prior art aqueous printing fluids include poor color strength, poor lightfastness, fiber "picking" from the cellulosic web during the printing process, etc.

Aqueous printing fluids for printing cellulosic materials of the type described above are known in the prior art. U.S. Pat. Nos. 3,864,296 and 3,880,792 disclose aqueous printing fluids and their use in printing cellulosic materials by a rotogravure intaglio printing process. The aqueous printing fluids disclosed in these patents comprise a water-soluble cationic, thermosetting resin and a water-soluble anionic dye which must be compatible with the selected resin. Although these prior art printing fluids impart reasonably good bleed resistance toward water, the bleed resistance of paper printed with such fluids is poor when the imprinted papers are tested with other common household fluids such as milk, vinegar, soft drinks, alkaline based detergents, etc. Moreover, the color strength of such printing fluids is only marginally acceptable.

Although the desired level of bleed resistance may be achieved with pigment-based printing fluids, such fluids are not bleachable and hence, paper towels printed with such fluids are not repulpable. For example paper towels printed with pigment-based printing fluids cannot be bleached and repulped to provide a white paper towel. Any traces of pigment present during the repulping process will remain in the repulped paper towel.

DETAILS OF THE INVENTION

The problems described above in respect to the prior art aqueous printing fluids have been overcome with the aqueous printing fluids of the present invention. These fluids comprise:
(a) water;
(b) a cationic polyaminoamide/epichlorohydrin resin;
(c) a water soluble cationic dye; and
(d) 0 up to about 3 wt. %, based on the weight of the printing fluid, of a bleachable pigment.

Preferably, the water content of the present printing fluids will be in the range of about 10 to 70 wt. %, based on the weight of the fluid. The content of the cationic polyaminoamide/epichlorohydrin resin is preferably in the range of about 5 to 20 wt %, based on the weight of the fluid. The water soluble cationic dye is preferably present in an amount of about 0.1 to 8 wt. %, based on the weight of the fluid. The solids ratio of the resin to the dye is in the range of about 0.5:1 to 30:1, preferably 1:1 to 5:1.

For many applications, especially where a yellow cationic dye is employed, it is desirable to incorporate up to about 3 wt. %, preferably 1-2 wt. %, based on the weight of the fluid, of a bleachable pigment, i.e. a pigment which will lose its coloration upon contact with typical hypochlorite-based bleaches. Incorporation of such pigment, especially where a yellow shade is desired, permits the formulation of a printing fluid in which the amount of cationic dye is reduced, thereby increasing the bleed resistance of the fluid. However, a reduction in the amount of dye results in a concomitantly undesirable reduction in color strength which in turn may be overcome by incorporation of the bleachable pigment.

Desirably, the pigment which is optionally incorporated in the printing fluid of the present invention is one which is bleachable, i.e. one which loses its color upon contact with bleaches such as typical sodium hypochlorite bleaches. When the printed cellulosic material, e.g. paper toweling, is to be recycled, the pulp must be bleached in order to remanufacture white toweling. Since separation of pigment particles from the pulp particles is practically impossible to achieve on a commercially viable basis, the alternative is to allow the pigment particles to remain in the recycled pulp, and bleach out all color such that white pulp may be remanufactured. Useful bleachable pigments include C.I. Pigment Yellow 62, C I. Pigment Violet 23, C.I. Pigment Red 57, etc. Since the bleachable pigment is not soluble in water, it is convenient to incorporate it into the printing fluid by pre-dispersing it in the cationic polyaminoamide/epichlorohydrin resin.

The preparation of cationic polyaminoamide/epichlorohydrin resins is well documented in the patent literature e.g. see U.S. Pat. No. 2,926,116. Typically, an aqueous polyaminoamide base is prepared from the condensation reaction of adipic acid and diethylenetriamine. Epichlorohydrin is then allowed to react with the base until the desired solution viscosity (degree of crosslinking, or molecular weight) is obtained. The reaction is then stopped and the system is stabilized by acidifying the resin solution with hydrochloric acid.

Cationic polyaminoamide/epichlorohydrin resins are readily commercially available. For example, Fibrabon ® 3400, available from Henkel Corporation, is a 34% aqueous solution of cationic polyaminoamide/epichlorohydrin resin having a density of 1.10 g/ml, a pH of 3.0, a total % nitrogen value via elemental analysis of 4.3-7.3 (typically 5.8%) on an as-is basis and a solution viscosity of 125–250 centipoise at 25° C. (Brookfield #2 spindle/60 rpm).

For many applications where enhance color strength is desired, it is useful to incorporate about 20 to 50 wt. %, based on the weight of the fluid, of urea. It may also be useful to incorporate about 0.1 to 0.5 wt. %, based on the weight of the fluid, of a silicone antifoam agent and about 1 to 5 wt. %, based on the weight of the fluid, of a nonionic surfactant such as an ethoxylated polyamine. It is also desirable to incorporate a glycol in the fluid in an amount of about 2 to 6 wt. %, based on the weight of the fluid. Suitable glycols are propylene glycol, ethylene glycol, hexylene glycol, diethylene glycol, dipropylene glycol, etc.

Cationic dyes, also known as basic dyes, are well known in the prior art and are commercially available in a wide selection of shades. These dyes are generally hydrochloride salts of color bases formed by partial dissociation of charged dye ions (cations). Such dyes have a high affinity for mechanical pulps and unbleached pulps which have a large amount of acid groups in the fiber. The cationic dye reacts with these acid groups to produce by salt formation very stable lakes that are insoluble in water.

On the other hand, cationic dyes are poorly suited for printing of bleached pulp such as single or multi-ply toilet/facial tissue, single or multi-ply absorbent wiping towels, single or multi-ply napkins and the like, since such cellulosic materials contain few acid groups after bleaching. Thus, absent the present invention, cationic dyes imprinted on such bleached cellulosic materials will exhibit poor bleed resistance upon exposure to water and other common household fluids such as milk, vinegar, soda, alkaline-based detergents, etc.

Cationic dyes which have proven to be useful for the purposes of the present invention are readily available in the most often-used shades: red, yellow, blue, orange, violet, green, brown, etc. such as C.I. Basic Reds 1, 1:1, 2, 8, 14, 28; C.I. Basic Yellows 2, 13, 28, 37, 65, 98, 102; C.I. Basic Blues 1, 3, 5, 7, 8, 9, 11, 26, 55, 81, 152; C.I. Basic Orange 1, 2 and 59; C.I. Basic Violets 1, 2, 3, 11:1, 14; C.I. Basic Greens 1, 4; C.I. Basic Brown 1.

This invention may be better understood by reference to the following illustrative examples.

EXAMPLE 1

A printing fluid was prepared using a cationic dye solution consisting of 16.5 g C.I. Basic Blue 152, 30.5 g glacial acetic acid and 53 g water. A 20 g sample of this dye solution was mixed with 80 g of a varnish of 24.7 g Fibrabon ® 3400 (a polyaminoamide/epichlorohydrin resin identified above), 5 g propylene glycol, 3 g ethoxylated polyamine nonionic surfactant, 0.3 g silicone anti-foam agent, 30 g urea and 17 g water. The ingredients were mixed in a low speed laboratory stirrer for about 10 minutes resulting in a printing fluid with high color strength. The fluid had an immediate viscosity of 18.3 sec. and a viscosity or 18.9 sec. after 4 days (Zahn 2 viscometer @ 25° C.).

Paper toweling was then imprinted with the fluid with a flexographic hand proofer (with a 65 line/cm anilox roller). A 2 ml sample of a 4 wt. % solution of acetic acid was then applied to the imprinted paper toweling which was then hung up to dry. The paper toweling exhibited severe bleeding which improved over a 3-day period.

EXAMPLE 2

Example 1 was repeated with an increased resin:dye ratio. 20 g of the same cationic dye solution were mixed with 80 g of a varnish of 41.7 g Fibrabon ® 3400, 5 g propylene glycol, 3 g ethoxylated polyamine nonionic surfactant, 0.3 g silicone anti-foam agent, 30 g urea and no additional water. The resultant printing fluid had a very high color strength and an immediate viscosity of 33.7 sec., a viscosity of 34.9 sec. after 18 hours and a viscosity of 35.2 sec. after 5 days. 100 g of this printing fluid were diluted with 40 g water. Paper toweling imprinted with this diluted printing fluid and tested for bleed resistance in the same manner as in Example 1 exhibited a slight initial bleed which improved to no bleed over a 7-day period.

EXAMPLE 3

In this example, the cationic dye solution was Basic Red "Fastusol C" having a PMN of 91-1122 obtained from BASF Corporation; this dye solution consisted of 10 wt. % dye, 4.5 wt. % lactic acid, 1.1 wt. % acetic acid, 1.4 wt. % sulfamic acid and 83 wt. % water. 4.1 g of this dye solution were mixed with 0.3 g of a 10 wt. % aqueous dispersion of C.I. Pigment Violet 23 (this dispersion also contained 2 wt. % acetic acid and 7 wt. % lactic acid). To this mixture were slowly added, with mixing, 17.8 g of a varnish prepared with the same ingredients and the same amounts as set forth in Example 2.

Thereafter, 12 g of a 17.5 wt. % aqueous dispersion of C.I. Pigment Yellow 62 (which included 12.9 wt. % Fibrabon ® 3400), 23.2 g of a 40 wt. % aqueous urea solution and 42.6 g of the same varnish as set forth in Example 2 were added and the ingredients were mixed together until a homogenous printing fluid was obtained. This solution exhibited an immediate viscosity of 35 sec. (Shell 3 viscometer @ 25° C.) and was employed to test bleed resistance of paper toweling as described below.

Blank single-ply paper toweling was imprinted with the printing fluid using a flexographic hand proofer (with a 37 line/cm anilox roller). Two 2.5 cm strips were cut from the imprinted paper toweling in a direction perpendicular to the direction of print. Two 2.5 cm blotter strips were cut from two ply paper toweling. One blotter strip was placed on a glass table top and a printed strip was placed on top of the blotter strip with the printed side down. The second printed strip was placed on top of the first printed strip with the printed side up. Thereafter a second blotter strip was placed on top of the three strips.

The four-strip sandwich Was then saturated with 3 g water and immediately thereafter a 1 kg weight was placed on the sandwich directly over the printed area. After 4 minutes, the weight was removed and the four strips were separated and allowed to dry. The test was repeated over a 5-day period and it was observed that the printed strips did not bleed onto the blotter strips and there was no discernible difference in color strength between the tested printed strips and untested printed strips.

For comparative purposes, an "Autumn Brown" shade of aqueous printing fluid was prepared from the following ingredients: 2.5 g C.I. Basic Yellow 102 dye (15 wt. % aqueous solution with 5.5 wt. % sulfamic. acid), 4.1 g Basic Red dye solution "Fastusol C" having a PMN of 91-1122 (10 wt. % aqueous solution with 4.5 wt. % lactic acid, 1.1. wt. % acetic acid and 1.4 wt. % sulfamic acid), 0.1 g C.I. Basic Blue 152 dye (16.5 wt. % aqueous solution ), 0.2 g 10 wt. % aqueous dispersion of C.I. Pigment Violet 23, 36.4 g Fibrabon® 3400, 4.4 g propylene glycol, 2.6 g ethoxylated amine nonionic surfactant, 0.3 g silicone anti-foam agent, 35.5 g solid urea and 13.9 g water. Paper toweling was then imprinted and tested for bleed resistance as described above. The strips were inspected over a 5-day period and it was observed that the printed strips bled slightly onto the blotter strips when the test was performed 30 minutes after printing and throughout the 5-day period each time the test was repeated on the original print. Furthermore, there was a slight difference in color strength between the tested printed strips and untested printed strips.

Paper towelling was imprinted with the printing fluids shown in TABLE I and the imprinted paper toweling was tested for bleed resistance in accordance with the procedure set forth in Example 1 using the household products set forth in TABLE 2 below. The tests were carried out 3 days after the paper toweling had been imprinted.

TABLE II

| Fluid | % Bleed | | | | | | | | | | | |
|---|---|---|---|---|---|---|---|---|---|---|---|---|
| | Bacon Fat | Formula "409" | Hamburger | Vinegar | Ivory Soap | "Comet" | "Windex" | Milk | "Crisco Oil" | Hot Water | Ethyl Alc. | Or. Juice |
| Blue 101 | 0 | 0 | 0 | 5 | 0 | 0 | 0 | 0 | 0 | 0 | 0 | 0 |
| Blue 103 | 0 | 0 | 0 | 10 | 0 | 0 | 0 | 0 | 0 | 0 | 0 | 0 |
| Yel. 105 | 0 | 0 | 0 | 20 | 5 | 0 | 0 | 0 | 0 | 0 | 5 | 0 |
| Red 106 | 0 | 0 | 0 | 5 | 0 | 0 | 0 | 0 | 0 | 0 | 5 | 0 |
| Viol. 107 | 0 | 0 | 0 | 5 | 0 | 0 | 0 | 0 | 0 | 0 | 0 | 0 |
| Or. 108 | 0 | 30 | 0 | 20 | 5 | 0 | 0 | 0 | 0 | 0 | 20 | 0 |
| Yel. 109 | 0 | 10 | 0 | 5 | 10 | 5 | 5 | 0 | 0 | 0 | 5 | 5 |

EXAMPLE 4

In this example, the resin employed in preparing the printing fluids indicated below was Hercules® 2043 resin, a water-soluble polyamide/epichlorohydrin polymer formulation having the following properties: total solids: 27%; density @ 25° C.: 1.080; viscosity @ 25° C.: 75-95 cps; nitrogen (dry basis): 12.8%; pH: 2.5-3.0; freezing point: −2° C. The printing fluids also contained the components and the number of parts as shown in Table I below. "Pro.G" refers to propylene glycol; "Surf." refers to surfactant of Example 3; "Sil." refers to a silicone anti-foam agent; "77L" refers to C.I. Basic Blue 152; "8444L" refers to a Basic Yellow dye with a PMN of 88-1955 obtained from BASF Corporation; "8401L" refers to C.I. Pigment Violet 23; "75LN" refers to the Basic Red of Example 3; "52LN" refers to C.I. Basic Yellow 102; and "59LU" refers to C.I. Basic Orange 65.

What is claimed is:

1. A printing fluid for printing cellulosic webs which comprises:
   (a) water;
   (b) a cationic polyaminoamide/epichlorohydrin resin;
   (c) a water soluble cationic dye; and
   (d) 0 up to about 3 wt. %, based on the weight of the printing fluid, of a bleachable pigment.

2. The printing fluid of claim 1 including about 20 to 50 wt. %, based on the weight of the fluid, of urea.

3. The printing fluid of claim 1 including about 1 to 5 wt. %, based on the weight of the fluid, of a nonionic surfactant.

4. The printing fluid of claim 1 including about 0.1 to 0.5 wt. %, based on the weight of the fluid, of a silicone antifoam agent.

5. The printing fluid of claim 1 including about 2 to 6 wt. %, based on the weight of the fluid, of a glycol.

6. The printing fluid of claim 1 wherein the water is present in an amount of about 10 to 70 wt. %, based on the weight of the fluid.

7. The printing fluid of claim 1 wherein the resin is present in an amount of about 5 to 20 wt. %, based on the weight of the fluid.

8. The printing fluid of claim 1 wherein the dye is present in an amount of about 0.1 to 8 wt. %, based on the weight of the fluid.

TABLE I

| Component | Blue 101 | Blue 103 | Yel. 105 | Red 106 | Viol. 107 | Or. 108 | Yel. 109 |
|---|---|---|---|---|---|---|---|
| Resin | 31.2 | 31.2 | 31.2 | 31.2 | 31.2 | 31.2 | 31.2 |
| Pro. G | 5.0 | 5.0 | 5.0 | 5.0 | 5.0 | 5.0 | 5.0 |
| Surf. | 3.0 | 3.0 | 3.0 | 3.0 | 3.0 | 3.0 | 3.0 |
| Sil. | 0.3 | 0.3 | 0.3 | 0.3 | 0.3 | 0.3 | 0.3 |
| Water | 20.5 | 10.5 | 10.5 | 10.5 | 10.5 | 10.5 | 10.5 |
| Urea | 20.0 | 30.0 | 30.0 | 30.0 | 30.0 | 30.0 | 30.0 |
| 77L | 20.0 | 20.0 | — | — | — | — | — |
| 8444L | — | — | 20.0 | — | — | — | — |
| 75LN | — | — | — | 20.0 | — | — | — |
| 8401L | — | — | — | — | 20.0 | — | — |
| 59LU | — | — | — | — | — | 20.0 | — |
| 52LN | — | — | — | — | — | — | 20.0 |
| TOTAL | 100 | 100 | 100 | 100 | 100 | 100 | 100 |

9. The printing fluid of claim 1 wherein the resin present in the form of a 34 wt. % aqueous solution has a total % nitrogen via elemental analysis in the range of 4.3 to 7.3 and a solution viscosity in the range of about 125 to 250 centipoise at 25° C. (Brookfield #2 spindle/60 rpm.

10. The printing fluid of claim 1 wherein the cationic dye comprises a yellow dye and the bleachable pigment comprises C.I. Pigment Yellow 62.

* * * * *